US008676447B2

(12) United States Patent
Togura et al.

(10) Patent No.: US 8,676,447 B2
(45) Date of Patent: Mar. 18, 2014

(54) OCCUPANT POSTURE SENSING APPARATUS AND OCCUPANT POSTURE SENSING METHOD

(75) Inventors: Takeshi Togura, Sakura (JP); Koichi Ichihara, Sakura (JP); Koji Sakiyama, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/147,055

(22) PCT Filed: Feb. 1, 2010

(86) PCT No.: PCT/JP2010/051350
§ 371 (c)(1),
(2), (4) Date: Sep. 6, 2011

(87) PCT Pub. No.: WO2010/087479
PCT Pub. Date: Aug. 5, 2010

(65) Prior Publication Data
US 2011/0313622 A1 Dec. 22, 2011

(30) Foreign Application Priority Data

Jan. 30, 2009 (JP) ................................. 2009-019764

(51) Int. Cl.
*G06F 17/00* (2006.01)
(52) U.S. Cl.
USPC ............... 701/45; 701/49; 340/562; 340/566; 340/667; 280/735
(58) Field of Classification Search
USPC ............ 701/45, 49; 600/595; 73/862.04, 779; 340/562, 665, 667; 280/36, 735; 297/284.9; 359/843, 877; 307/10.1
See application file for complete search history.

(56) References Cited

U.S. PATENT DOCUMENTS 5,602,734 A 2/1997 Kithil
5,691,693 A 11/1997 Kithil
(Continued)

FOREIGN PATENT DOCUMENTS

CN 1603842 A 4/2005
EP 1 813 480 A2 8/2007
(Continued)

OTHER PUBLICATIONS

International Search Report of PCT/JP2010/051350, mailing date Apr. 6, 2010.
(Continued)

*Primary Examiner* — McDieunel Marc
(74) *Attorney, Agent, or Firm* — Westerman, Hattori, Daniels & Adrian, LLP (57) ABSTRACT

To be configured inexpensively to enable cost reduction and sense sitting posture of an occupant highly accurately, occupant posture sensing apparatus 100 includes capacitance sensor unit 10 and circuit unit 20. Capacitance sensor unit 10 includes first and second sensing electrodes 11 and 12 provided at portions of vehicle interior ceiling 2 ahead of and right above a seat 40 and connected to capacitance sensing circuit 21 of circuit unit 20 and shield-driving circuit 23 through selector switches SW1 and SW2. CPU 29 of circuit unit 20 determines sitting posture of occupant (human body) 48 sitting on the seat 40 based on information regarding position of head 49 of the occupant 48 by using capacitance values detected by capacitance sensing circuit 21 based on capacitances from sensing electrodes 11 and 12. Posture information regarding the determined sitting posture is output to ECU mounted on a vehicle 1 and used for controlling air bag deployment, etc.

20 Claims, 9 Drawing Sheets

(56) References Cited

U.S. PATENT DOCUMENTS

| | | | |
|---|---|---|---|
| 5,802,479 | A | 9/1998 | Kithil et al. |
| 5,844,486 | A | 12/1998 | Kithil et al. |
| 6,014,602 | A | 1/2000 | Kithil et al. |
| 6,020,812 | A | 2/2000 | Thompson et al. |
| 6,275,146 | B1 | 8/2001 | Kithil et al. |
| 6,666,292 | B2 * | 12/2003 | Takagi et al. ............ 180/274 |
| 7,295,123 | B2 * | 11/2007 | Engelberg et al. ........ 340/576 |
| 7,436,299 | B2 * | 10/2008 | Shieh et al. .............. 340/561 |
| 7,469,594 | B2 * | 12/2008 | Jitsui et al. ................. 73/779 |
| 7,661,706 | B2 * | 2/2010 | Yoshifuku et al. ........ 280/735 |
| 7,918,144 | B2 * | 4/2011 | Saitoh et al. ......... 73/862.046 |
| 2005/0072233 | A1 | 4/2005 | Nozoe |
| 2006/0005630 | A1 * | 1/2006 | Jitsui et al. ................. 73/779 |
| 2007/0029768 | A1 * | 2/2007 | Clos et al. ................. 280/735 |

FOREIGN PATENT DOCUMENTS

| | | |
|---|---|---|
| EP | 1 897 744 A2 | 3/2008 |
| JP | 09-018321 A | 1/1997 |
| JP | 2000-510408 A | 8/2000 |
| JP | 2000-355264 A | 12/2000 |
| JP | 2001-094408 A | 4/2001 |
| JP | 2001-294117 A | 10/2001 |
| JP | 2002-514986 A | 5/2002 |
| JP | 2002-365011 A | 12/2002 |
| JP | 2003-530576 A | 10/2003 |
| JP | 2005-227244 A | 8/2005 |
| JP | 2005-327636 A | 11/2005 |
| JP | 2006-145413 A | 6/2006 |
| JP | 2006-177838 A | 7/2006 |
| JP | 2006-284201 A | 10/2006 |
| JP | 2007-045415 A | 2/2007 |
| JP | 2008-046080 A | 2/2008 |
| JP | 2008-081040 A | 4/2008 |
| JP | 2008-510396 A | 4/2008 |
| JP | 2008-157920 A | 7/2008 |
| JP | 2008-265376 A | 11/2008 |
| JP | 2010-054350 A | 3/2010 |
| WO | 97/35738 A1 | 10/1997 |
| WO | 97/39920 A1 | 10/1997 |
| WO | 01/78029 A1 | 10/2001 |
| WO | 2006/017988 A1 | 2/2006 |

OTHER PUBLICATIONS

Extended European Search Report dated Oct. 24, 2013, issued in corresponding European Patent Application No. 10735939.0.

* cited by examiner

Rear ← → Front

OCCUPANT POSTURE SENSING APPARATUS AND OCCUPANT POSTURE SENSING METHOD

TECHNICAL FIELD

The present invention relates to an occupant posture sensing apparatus and an occupant posture sensing method for sensing a posture of an occupant sitting on a seat of a vehicle.

BACKGROUND ART

As vehicles such as automobiles become high-end, it is becoming common to control the deployment of an air bag for protecting an occupant when in a car crash, etc., based on the posture of the occupant and so forth. As such a technique for sensing a posture of an occupant, the head position detecting system disclosed in Patent Document 1 identified below is known, for example.

This head position detecting system includes: an oscillating unit which includes an oscillating electrode provided in a seat portion (seating portion) and capable of becoming electrically conductive with an occupant sitting (seated) on the seat (seating) through a high-frequency wave and which applies an oscillating output between the oscillating electrode and a metal frame; and a distance measuring sensor including a receiving electrode which is provided in an insulated state in the ceiling of the vehicle interior to be opposite to the oscillating electrode.

This head position detecting system further includes: a calibration sensor which performs measurement with a calibration receiving electrode which is provided in an insulated state, at a known distance from a conductive surface which becomes electrically conductive with an occupant, and to be opposite to that conductive surface; and a processing circuit which determines characteristic curves between distances and output voltages of the receiving electrode based on the result of the measurement, and fits the value of each output voltage to a corresponding characteristic curve to obtain a distance. The head position detecting system detects a position of a head by measuring a distance between the head of the occupant and the receiving electrode.

CONVENTIONAL ART DOCUMENT

Patent Document

Patent Document 1: JP2002-365011A

SUMMARY OF INVENTION

Problem to be Solved by the Invention

However, in the head position detecting system disclosed in Patent Document 1 identified above, the oscillating electrode and the receiving electrode are provided above and under the seating respectively. Therefore, the wiring length becomes long and the system configuration becomes complicated, which raises a problem in saving costs.

To solve the problem of the conventional art described above, the present invention aims for providing an occupant posture sensing apparatus and occupant posture sensing method which allow a low-cost configuration for saving costs and can sense a posture of an occupant highly accurately.

Means for Solving the Problem

To solve the problem described above and achieve the object, a first occupant posture sensing apparatus according to the present invention includes: two sensing electrodes which are arranged at portions of a vehicle interior ceiling of a vehicle that are above a seat so as to be capable of sensing capacitances between a head of a human body sitting on the seat and the vehicle interior ceiling, and which sense capacitances between the head of the human body sitting on the seat and the vehicle interior ceiling; a detecting circuit which is connected to each of the sensing electrodes and detects a position of the head of the human body based on sensing signals from the sensing electrodes; and a posture determining circuit which determines a sitting posture of the human body according to a detection result from the detecting circuit.

With the configuration described above, the first occupant posture sensing apparatus according to the present invention only requires providing two sensing electrodes on the vehicle interior ceiling as compared with the conventional technique, and enables a simple configuration that does not necessitate such components as an oscillating electrode and a receiving electrode, the distance between both of which is hence no longer a problem. Therefore, the occupant posture sitting apparatus can be built up at a low cost, enabling to seek cost reduction. Particularly, it is preferable to detect the parietal region of the head of the human body.

One of the sensing electrodes may be arranged so as to be capable of sensing a capacitance between the head of the human body sitting on the seat and a portion of the vehicle interior ceiling that is ahead of and above a front of the seat, and the other of the sensing electrodes may be arranged so as to be capable of sensing a capacitance between the head of the human body sitting on the seat and a portion of the vehicle interior ceiling that is right above the seat.

One of the sensing electrodes may be arranged so as to be capable of sensing a capacitance between the head of the human body sitting on the seat and a portion of the vehicle interior ceiling that is at a lateral side of the seat, and the other of the sensing electrodes may be arranged so as to be capable of sensing a capacitance between the head of the human body sitting on the seat and a portion of the vehicle interior ceiling that is right above the seat.

The detecting circuit may include a plurality of capacitance sensing circuits of a C-V converting type which are connected one-to-one to the sensing electrodes and convert capacitances sensed by the sensing electrodes to voltages respectively.

The detecting circuit may include a capacitance sensing circuit of a C-V converting type which converts a capacitance sensed by each of the sensing electrodes to a voltage, and the capacitance sensing circuit may be connected to each of the sensing electrodes through switch means.

The occupant posture sensing apparatus may further include a shield-driving circuit which shield-drives one of the sensing electrodes.

The detecting circuit may control the switch means to connect the sensing electrode that is sensing a capacitance to the capacitance sensing circuit and the other sensing electrode to the shield-driving circuit.

A second occupant posture sensing apparatus according to the present invention includes at least three sensing electrodes which are arranged at portions of a vehicle interior ceiling of a vehicle that are above a seat so as to be capable of sensing a position on a certain plane, and which sense capacitances between a head of a human body sitting on the seat and the vehicle interior ceiling; a detecting circuit which is connected to each of the sensing electrodes and detects a position of the head of the human body based on sensing signals from the sensing electrodes; and a posture determining circuit which determines a sitting posture of the human body according to a detection result from the detecting circuit.

With the configuration described above, the second occupant posture sensing apparatus according to the present invention only requires providing sensing electrodes on the vehicle interior ceiling as compared with the conventional technique, and enables a simple configuration that does not necessitate such components as an oscillating electrode and a receiving electrode, the distance between both of which is hence no longer a problem. Therefore, the occupant posture sitting apparatus can be built up at a low cost and can sense the posture of the occupant highly accurately. Particularly, it is preferable to detect the parietal region of the head of the human body.

The detecting circuit is connected to the sensing electrodes through, for example, selector switches respectively, the occupant posture sitting apparatus further includes a driving circuit which is connected to the sensing electrodes through the selector switches respectively, and outputs a certain voltage to each of the sensing electrodes, and the posture determining circuit controls switching operations of the selector switches such that when one of the sensing electrodes is alternatively connected to the detecting circuit, the other sensing electrodes are connected to the driving circuit.

The detecting circuit may be configured to, after detecting the position of the head of the human body directly from capacitance values of the respective sensing electrodes, further perform a corrective calculation process that is required for obtaining a corrected value of the position of the head in an X direction and a corrected value of the position of the head in a Y direction from the capacitance values of the sensing electrodes to let the posture determining circuit determine the sitting posture of the human body based on the obtained corrected values.

The sensing electrodes may be arranged on the vehicle interior ceiling to form a triangular plane such that it has only one vertex at a front side of the vehicle, or to form a triangular plane such that it has only one vertex at a rear side of the vehicle. When there are four sensing electrodes, they may be arranged to form a quadrangular plane such that it has sides in a front-rear direction and a left-right direction of the vehicle, for example.

The detecting circuit may include, for example, a capacitance sensing circuit of a C-V converting type which converts a capacitance sensed by each of the sensing electrodes to a voltage.

In the above-described occupant posture sensing apparatus according to the present invention, the detecting circuit may include, for example, a capacitance sensing circuit of a differentially-operating type, and an auxiliary electrode may be provided near each of the sensing electrodes so as to be connected to such an input terminal of the capacitance sensing circuit as has an inverting input of an input terminal to which the sensing electrode is connected.

The posture determining circuit may output information regarding the determined sitting posture of the human body to an ECU which has a function of controlling deployment of an air bag mounted on the vehicle.

The occupant posture sensing apparatus may further include a shield portion which is provided on either or both of a back surface and a surrounding portion of each of the sensing electrodes and which is electrically insulated from the sensing electrode.

The shield portion may be supplied with an equal potential to that of the sensing electrode.

The detecting circuit may include memory means which pre-stores a capacitance value of when no human body is sitting on the seat, and when the human body is sitting on the seat, may output a detection result by regarding an amount of increase from the capacitance value stored in the memory means as a detected value.

A first occupant posture sensing method according to the present invention includes: sensing capacitances between a head of a human body sitting on a seat of a vehicle and a vehicle interior ceiling by means of two sensing electrodes which are arranged at portions of the vehicle interior ceiling that are above the seat so as to be capable of sensing capacitances between the head of the human body sitting on the seat and the vehicle interior ceiling; detecting a position of the head of the human body based on sensing signals from the sensing electrodes indicating sensed capacitances; and determining a sitting posture of the human body based on the detected position of the head.

A second occupant posture sensing method according to the present invention includes: sensing capacitances between a head of a human body sitting on a seat of a vehicle and a vehicle interior ceiling by means of at least three sensing electrodes which are arranged at portions of the vehicle interior ceiling that are above the seat so as to be capable of sensing a position on a plane; detecting a position of the head of the human body based on sensing signals from the sensing electrodes indicating sensed capacitances; and determining a sitting posture of the human body based on the detected position of the head.

Effect of the Invention

According to the present invention, it is possible to provide an occupant posture sensing apparatus and occupant posture sensing method which allow a low-cost configuration for saving costs and can sense a posture of an occupant highly accurately.

MODE FOR CARRYING OUT THE INVENTION

A first embodiment of the occupant posture sensing apparatus and occupant posture sensing method according to the present invention will now be described below in detail with reference to the attached drawings.

Figure 1:
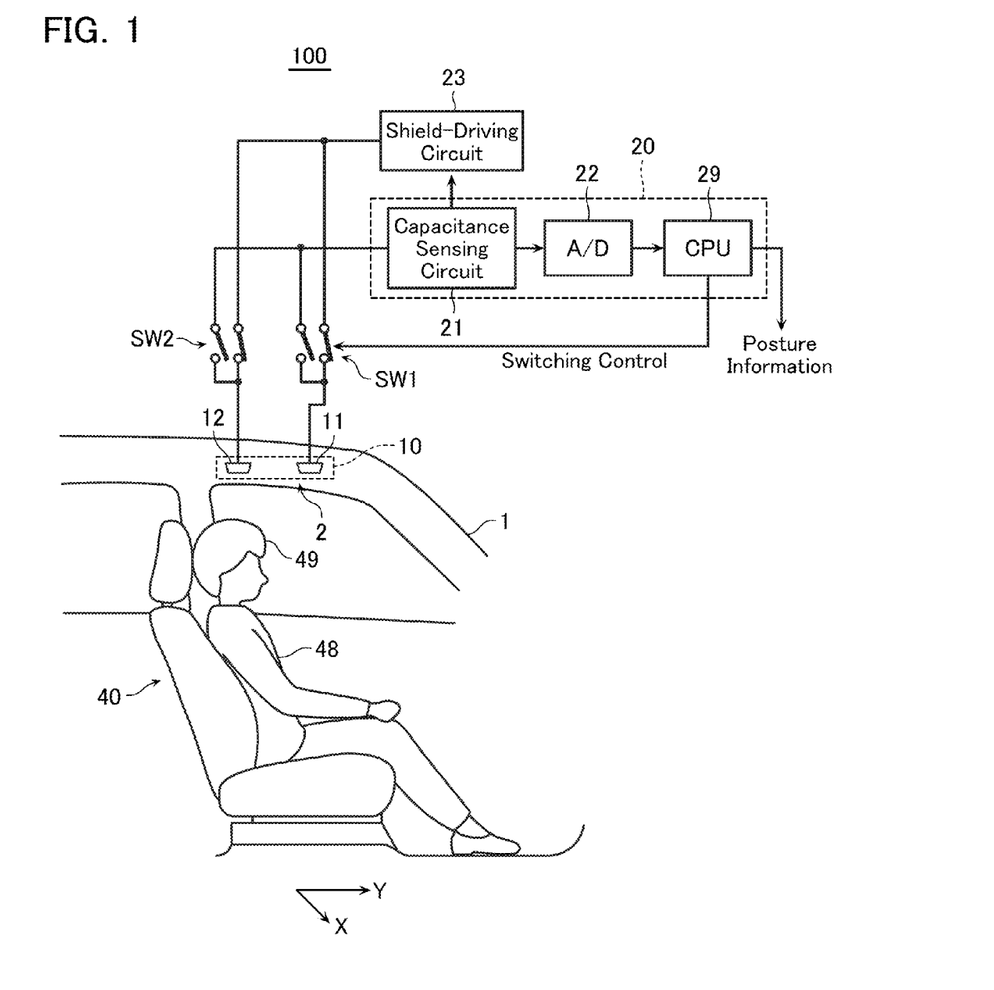
FIG. 1 is an explanatory diagram showing one example of an overall configuration of an occupant posture sensing apparatus according to a first embodiment of the present invention.

As shown in FIG. 1, an occupant posture sensing apparatus 100 according to the first embodiment includes: a capacitance sensor unit 10 including two sensing electrodes (a first sensing electrode 11 and a second sensing electrode 12) which are arranged, for example, in a vehicle interior ceiling 2 above a seat 40 of a vehicle 1 in a state capable of sensing the position of a head 49 of an occupant (a human body) 48 sitting on the seat 40; and a circuit unit 20 which determines a sitting posture based on the position of the head 49 of the occupant 48 sitting on the seat 40 by using an output from the capacitance sensor unit 10.

In this example, the sensing electrodes 11 and 12 of the capacitance sensor unit 10 are arranged inside the vehicle interior ceiling 2 or on the surface of the vehicle interior side such that, for example, the first sensing electrode 11 is capable of sensing a capacitance between the head 49 of the occupant 48 sitting on the seat 40 and a portion of the vehicle interior ceiling 2 that is ahead of the seat 40, and the second sensing electrode 12 is capable of sensing a capacitance between likewise the head 49 of the occupant 48 and a portion of the vehicle interior ceiling 2 that is right above the seat 40.

The capacitance sensor unit 10 configured in this way senses capacitances between the head 49 of the occupant 48 and the vehicle interior ceiling 2 (specifically, the first and second sensing electrodes 11 and 12). More specifically, the capacitance sensor unit 10 senses capacitances between the parietal region of the head 49 of the occupant 48 and the sensing electrodes 11 and 12.

In order to promote component modularization, the capacitance sensor unit 10 may be configured such that the first and second sensing electrodes 11 and 12 are arranged in the vehicle interior ceiling 2 in the way described above as formed on one surface of an unillustrated substrate, and the circuit unit 20 may be arranged as mounted on the same surface or the other surface of the substrate. Depending on the mode of arrangement, the units may be arranged separately.

When forming the capacitance sensor unit 10 on a substrate as described above, the substrate may be, for example, a flexible printed substrate, a rigid substrate, a rigid flexible substrate, etc. When the substrate is, for example, a flexible printed substrate, the sensing electrodes 11 and 12 are made of the followings.

The sensing electrodes 11 and 12 are made of a metal material such as copper, a copper alloy, aluminum, etc. which is patterned on a base material made of an insulating material such as polyethylene terephthalate (PET), polyethylene naphthalate (PEN), polyimide (PI), polyamide (PA), an epoxy resin, etc. Other than these, the sensing electrodes 11 and 12 may be formed in a membrane circuit or may be made of a conductive adhesive material or any other conductive metal.

In the present example, the sensing electrodes 11 and 12 are connected to a capacitance sensing circuit 21 of the circuit unit 20 through selector switches SW1 and SW2 respectively and to a shield-driving circuit 23 through these selector switches SW1 and SW2 respectively. The shield-driving circuit 23 may be provided in the circuit unit 20, though not illustrated.

The circuit unit 20 includes: a capacitance sensing circuit 21 which detects capacitance values of the sensing electrodes 11 and 12 based on sensing signals indicating capacitances sensed by the sensing electrodes 11 and 12; an A/D converter 22 which converts an analog signal from the capacitance sensing circuit 21 to a digital signal; and a CPU 29 which handles various controls on the occupant posture sensing apparatus 100 and arithmetic processing based on information converted to a digital signal by the A/D converter 22, and determines the sitting posture of the occupant 48 and outputs information (posture information) regarding the determined sitting posture to, for example, an unillustrated ECU (Electronic Control Unit) mounted on the vehicle 1.

The CPU 29 includes a RAM used as a region for temporarily storing information, a ROM capable of storing information temporarily or permanently, etc. The ECU has a function of controlling the deployment of an air bag mounted on the vehicle 1 (i.e., controlling the direction to which the air bag is opened, the expansion rate, etc.), and is hence capable of controlling the deployment of the air bag, referring to the posture information from the occupant posture sensing apparatus 100 of the present example.

The selector switches SW1 and SW2 are configured by such units as multiplexors, analog switches, FETs, relays, etc. The CPU 29 of the circuit unit 20 controls switching operations of the selector switches SW1 and SW2 by outputting a switching control signal. Specifically, the following switching control is performed in the occupant posture sensing apparatus 100 according to the present example.

That is, when, for example, the selector switch SW1 is switched by a switching control signal from the CPU 29 so as to connect the first sensing electrode 11 to the capacitance sensing circuit 21, the selector switch SW2 is switched to connect the second sensing electrode 12 to the shield-driving circuit 23.

When, for example, the selector switch SW2 is switched to connect the second sensing electrode 12 to the capacitance sensing circuit 21, the selector switch SW1 is switched to connect the first sensing electrode 11 to the shield-driving circuit 23. In this way, the CPU 29 determines the sitting posture of the occupant 48 based on capacitance values that are detected when the sensing electrode 11 and 12 are alternatively connected to the capacitance sensing circuit 21.

The shield-driving circuit 23 is configured to supply the sensing electrode connected thereto with an equivalent potential to that that is supplied by the capacitance sensing circuit 21. This enables to prevent the sensing electrodes 11 and 12 from being capacitively coupled to each other, allowing each of the sensing electrodes 11 and 12 to perform highly accurate sensing of a capacitance independently.

For example, the shield-driving circuit 23 may supply a potential that is generated by passing a potential supplied to the sensing electrode 11 or 12 through a unity amplifier (buffer) at an input impedance higher than this potential, or when the capacitance sensing circuit 21 is a differentially operating type as will be described later, may supply an equivalent potential by connecting a non-inverting input portion of an operational amplifier.

Figure 2:
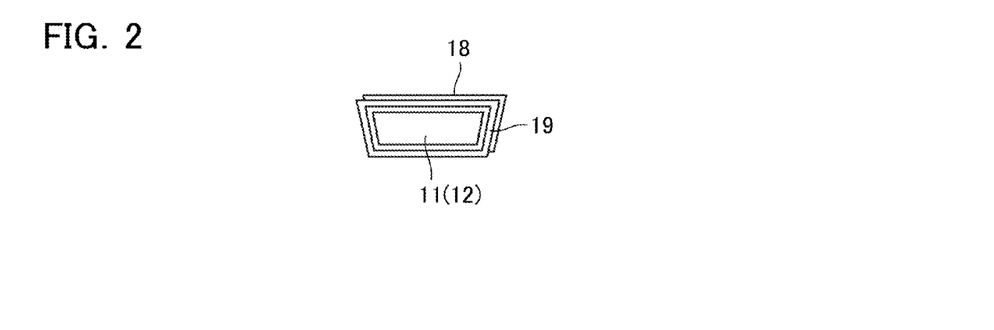
FIG. 2 is an explanatory diagram showing one example of a sensing electrode of the occupant posture sensing apparatus.

As shown in FIG. 2, each of the sensing electrodes 11 and 12 is formed in, for example, a rectangular shape, and may include a shield portion 18 which is provided at a back surface thereof (a surface opposite to the sensing region) and electrically insulated from the sensing electrode 11 or 12 for prohibiting sensing at the back surface, and a shield portion 19 which is provided at a surrounding portion thereof for bringing the same effect.

For example, these shield portions 18 and 19 are supplied with the same potential as that of the sensing electrodes 11 and 12. By including such shield portions 18 and 19, the sensing electrodes 11 and 12 can sense a capacitance between the vehicle interior ceiling 2 and the head 49 (specifically, the parietal region) more accurately.

By utilizing a principle that the occupant 48 can be substantially regarded as a ground (GND) because the occupant 48 has very large volume and dielectric constant as compared with the sensing electrodes 11 and 12, the occupant posture sensing apparatus 100 according to the first embodiment employs a configuration which enables the circuit unit 20 to determine the sitting posture of the occupant 48 by using capacitances between the sensing electrodes 11 and 12 and a ground (for example, the occupant 48).

Accordingly, with the occupant posture sensing apparatus 100 having such a configuration, it is possible to build, at a low cost, a system having a simple configuration and a high accuracy, as compared with a sensing system that necessitates sending and receiving of signals as in the head position detecting system explained as a conventional example. Hence, the occupant posture sensing apparatus 100 according to the first embodiment can be built up at a low cost and help in saving costs.

Figure 3:
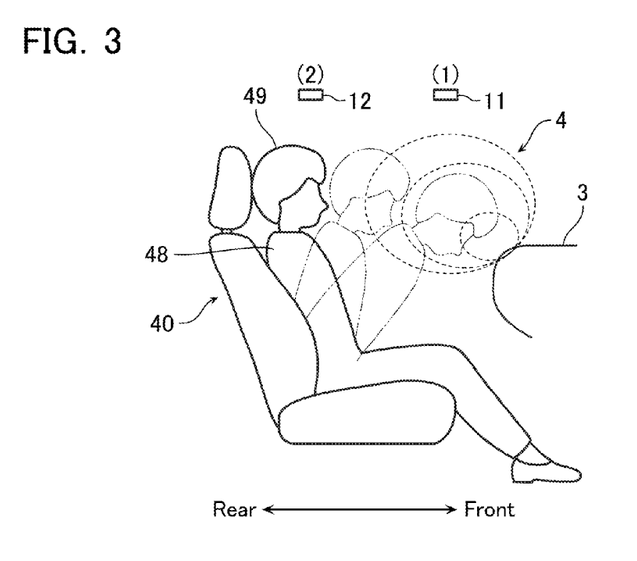
FIG. 3 is an explanatory diagram for explaining one example of a determining operation of the occupant posture sensing apparatus in a front-rear direction.

For example, as shown in FIG. 3, the occupant posture sensing apparatus 100 determines the position of the head 49 and senses the posture by using a capacitance value (a detected value 1) sensed by the first sensing electrode 11 provided ahead of the seat 40 and a capacitance value (a detected value 2) sensed by the second sensing electrode 12 provided right above the seat 40 to calculate a ratio between these detected values (for example, a detected value/(the detected value 1 +the detected value 2)).

Figure 4A:
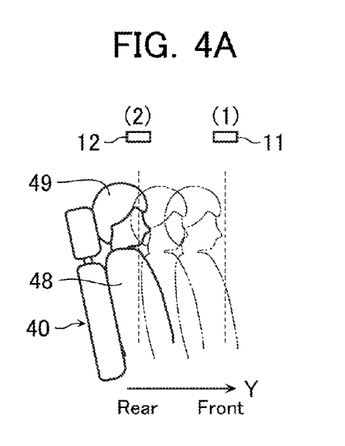
FIG. 4A is explanatory diagram for explaining one example of a determining operation of the occupant posture sensing apparatus in a front-rear direction.
Figure 4B:
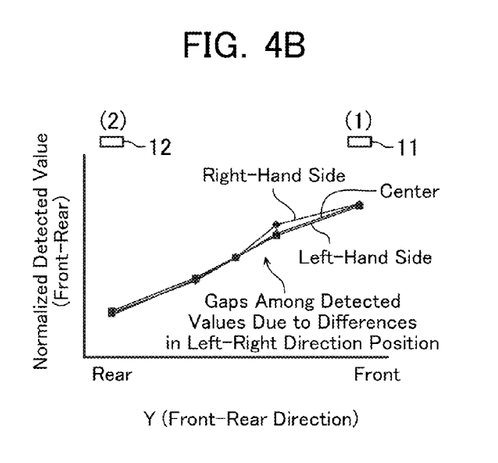
FIG. 4B is explanatory diagram for explaining one example of a determining operation of the occupant posture sensing apparatus in a front-rear direction.

According to this, it is possible to appropriately adjust and control a range 4 over which to deploy the air bag situated in a dashboard 3 with reference to the posture information that is based on the front-rear direction position of the head 49 of the occupant 48. A specific operation is as shown in FIG. 4A and FIG. 4B. The numbers (1) and (2) in the graphs of FIGS. 4A and 4B correspond to the first and second sensing electrodes 11 and 12, respectively.

As shown in FIG. 4A, for example, a detected value to be detected when the occupant 48 is sitting on the seat 40 lopsidedly to the front of the vehicle 1 and a detected value to be detected when the occupant 48 is sitting on the seat 40 in a normal posture (i.e., the occupant 48 is approximately right under the second sensing electrode 12 that is provided right above the seat 40) have the following difference even when the occupant 48 sways in the left-right direction (X direction).

That is, in any event, when the occupant 48 is sitting lopsidedly to the front, the detected value $\Delta C$ of the first sensing electrode 11 corresponding to (1) falls within a detected value range $\alpha$ that is higher than a certain threshold, while when the occupant 48 is sitting in the normal posture, the detected value $\Delta C$ of the second sensing electrode 12 corresponding to (2) falls within a detected value range $\beta$ that is lower than a certain threshold.

Detected values $\Delta C$ to be detected by the occupant posture sensing apparatus 100 are corrected values (normalized detected values (front-rear)) which are calculated based on the detected values $\Delta C$ of the first and second sensing electrodes 11 and 12. When the head 49 of the occupant 48 sitting on the seat 40 sways in the left-right direction (for example, the X direction), relationships between left-right direction (X direction) positions of the head 49 of the occupant 48 and the corrected values are represented similarly as shown in FIG. 4B, although there are some gaps among the detected values due to the differences in the front-rear direction position.

As can be understood from this, the normalized detected values (front-rear) described above are scarcely influenced by the differences in the left-right direction position of the head 49. Therefore, a front-rear direction (Y direction) posture of the occupant 48 can be sensed based on the detected value $\Delta C$ of the first sensing electrode 11 corresponding to (1) and the detected value $\Delta C$ of the second sensing electrode 12 corresponding to (2), with substantially no difference due to any shift of the occupant 48 in the left-right direction.

When the head 49 of the occupant 48 is approximately under the mid position between the first and second sensing electrodes 11 and 12, the detected value AC falls within a range $\gamma$ of intermediary values between the detected value $\Delta C$ of the first sensing electrode 11 corresponding to (1) and the detected value $\Delta C$ of the second sensing electrode 12 corresponding to (2). Accordingly, the sitting posture of the occupant 48 can be sensed with a simple configuration using two sensing electrodes 11 and 12.

Since the distance from the sensing electrodes 11 and 12 to the head 49 of the occupant 48 can be obtained by using their detected values AC, the front-rear direction position of the head 49 can be detected accurately by using a well-known distance calculation method or the like. Here, since the detected value $\Delta C$ is not substantially influenced in the front-rear direction by, for example, changes of the size of the head 49, the position of the head 49 can be determined by the method described above.

The occupant posture sensing apparatus 100 according to the first embodiment determines the sitting posture of the occupant 48 by connecting the first and second sensing electrodes 11 and 12 to the one capacitance sensing circuit 21 through the selector switches SW1 and SW2, switching the selector switches SW1 and SW2 under the switching control of the CPU 29 to let the sensing electrodes 11 and 12 sense capacitance values respectively, and using these capacitance values. However, for example, the sensing electrodes 11 and 12 may each be provided with a capacitance sensing circuit 21 to which it is connected exclusively. However, in this case, the respective capacitance sensing circuits 21 must be synchronized, because otherwise, one sensing electrode that is in the middle of sensing (measuring) a capacitance incurs influence from a potential change which might occur in the other sensing electrode during this sensing.

Figure 5:
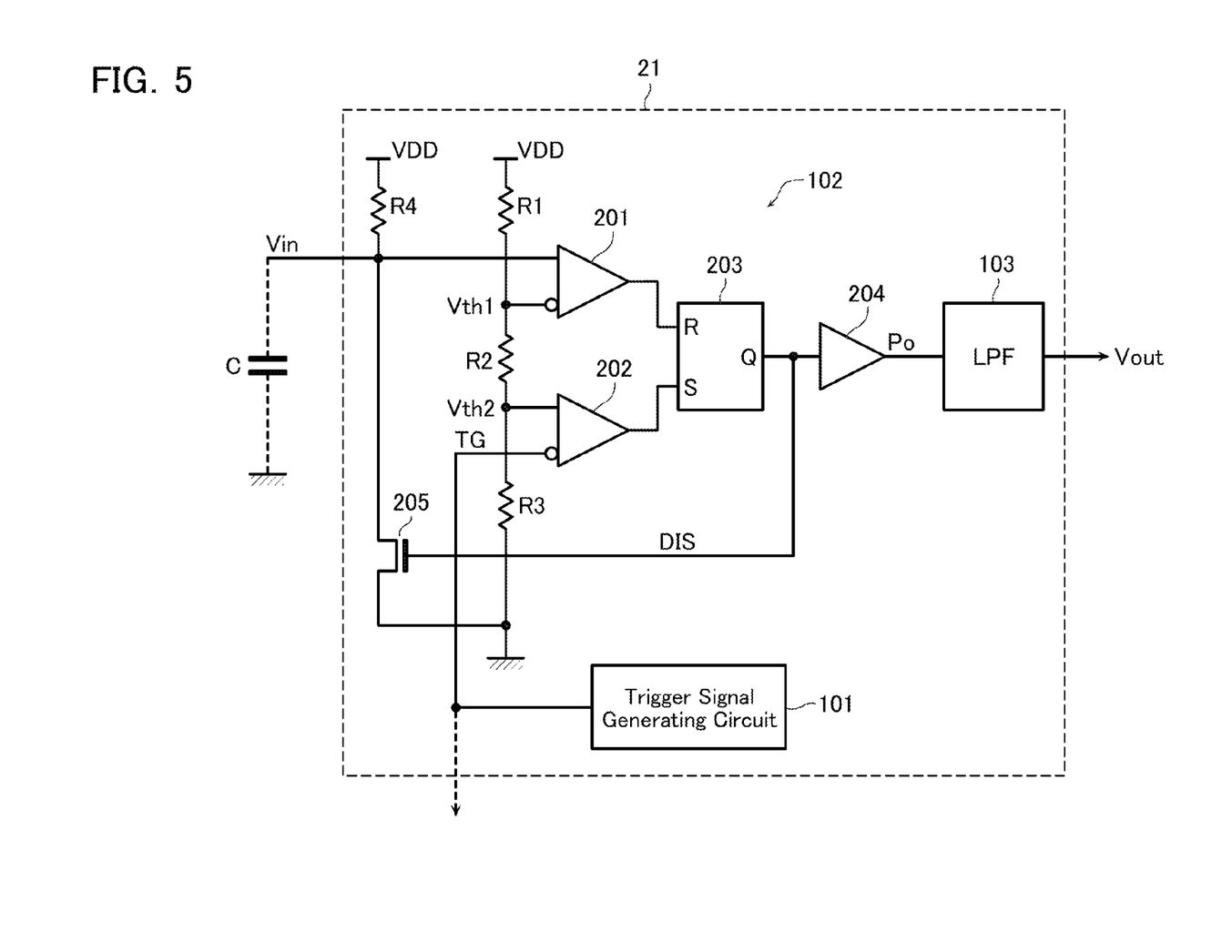
FIG. 5 is a block diagram showing one example of a capacitance sensing circuit of the occupant posture sensing apparatus according to the first embodiment of the present invention.

Here, as shown in FIG. 5, the capacitance sensing circuit 21 generates a pulse signal having a duty ratio which changes according to a capacitance between each of the sensing electrodes 11 and 12 and the head 49, and smoothes the pulse signal and outputs it as a sensing signal. That is, the capacitance sensing circuit 21 changes its duty ratio according to a capacitance C, and includes: a trigger signal generating circuit 101 which outputs a trigger signal TG having, for example, a constant period; a timer circuit 102 which outputs a pulse signal Po having a duty ratio which changes according to the level of the capacitance C connected to an input terminal; and a low-pass filter (LPF) 103 which smoothes the pulse signal Po.

For example, the timer circuit 102 includes: two comparators 201 and 202; an RS flip-flop circuit (hereinafter referred to as "RS-FF") 203 which receives outputs of the comparators 201 and 202 at its reset terminal R and its set terminal S respectively; a buffer 204 which outputs an output DIS of the RS-FF 203 to the LPF 103; and a transistor 205 which is controlled between on and off according to the output DIS of the RS-FF 203.

Figure 6:
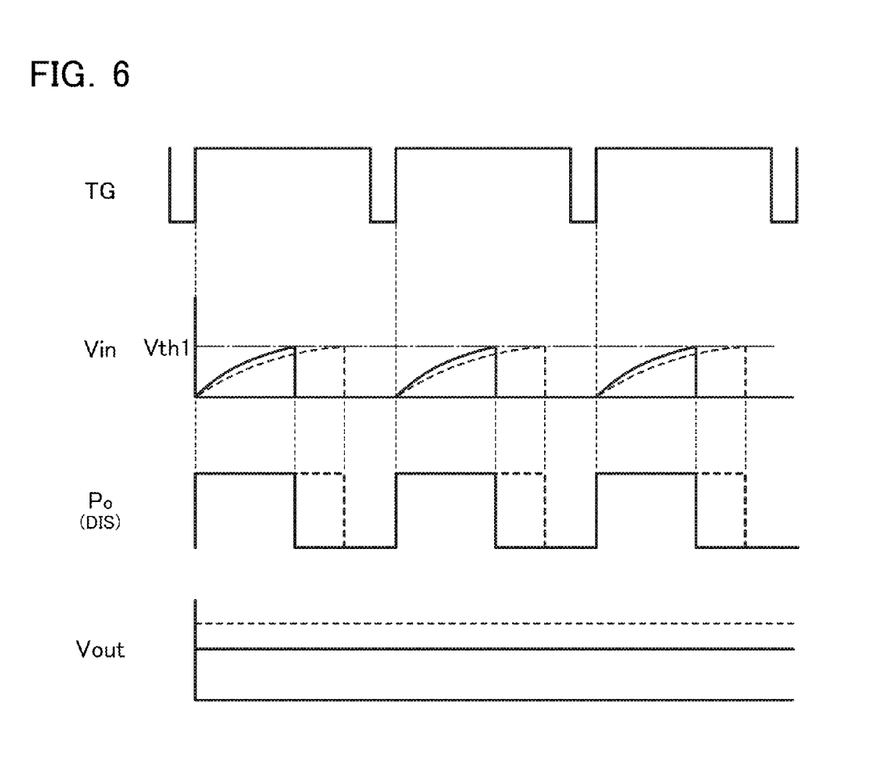
FIG. 6 is an operation waveform chart showing one example of operation waveforms of the occupant posture sensing apparatus.

The comparator 202 compares such a trigger signal TG as shown in FIG. 6 which is output by the trigger signal generating circuit 101 with a certain threshold Vth2 divided by resistors R1, R2, and R3, and outputs a set pulse synchronized with the trigger signal TG. This set pulse sets a Q output of the RS-FF 203.

The Q output as a discharge signal DIS turns off the transistor 205, and electrically charges between the sensing electrode 11 (12) and a ground at a speed defined by a time constant set by the to-ground capacitance C of the sensing electrode and a resistor R4 connected between the input terminal and a power supply line. Accordingly, the potential of an input signal Vin rises at a speed defined by the capacitance C.

When the input signal Vin exceeds a certain threshold Vth1 defined by the resistors R1, R2, and R3, the output of the comparator 201 is inverted, thereby inverting the output of the RS-FF 203. As a result, the transistor 205 is turned on, and the charges accumulated in the sensing electrode 11 (12) are discharged through the transistor 205.

Hence, the timer circuit 102 outputs a pulse signal Po which, as shown in FIG. 6, oscillates at a duty ratio that is based on the capacitance C between the sensing electrode 11 (12) and the head 49 of the human body 48 approaching the sensing electrode. The LPF 103 outputs a direct-current sensing signal Vout shown in FIG. 6 by smoothing the pulse signal Po. Note that in FIG. 6, a waveform indicated by a solid line and a waveform indicated by a dotted line show that the former has a smaller capacitance than that of the latter, and, for example, the latter represents a condition that an object is approaching.

In the above-described occupant posture sensing apparatus 100 according to the first embodiment, explained as the configuration of the circuit unit 20 for determining the sitting posture by using the position of the head 49 of the human body 48 based on sensed capacitances is one in which the capacitance sensing circuit 21 utilizes a C-V converting type well-known timer IC which converts a capacitance C to a voltage V and outputs a pulse having a duty ratio which changes according to resistors and a capacitor. However, the capacitance sensing circuit 21 is not limited to this type.

That is, for example, there is a method of measuring an impedance directly from a capacitance-dependent voltage change or from a current value by applying a sine wave. There is also a method of configuring an oscillation circuit by including therein a capacitance to be measured and measuring the oscillation frequency. There is also a method of configuring an RC charge/discharge circuit and measuring charging/discharging times. There is also a method of transferring charges accumulated by charging at a known voltage to a known capacity and measuring the voltage of the capacity. Further, there is also a method of performing plural times charging an unknown capacity at a known voltage and transferring the charges to a known capacity, and measuring the number of times taken until the known capacity is charged up to a certain voltage. A threshold may be set for a detected capacitance value or the capacitance sensing circuit may function as a switch by performing such a process as analyzing the signal waveform of the capacitance and starting a triggering operation when a corresponding capacitance waveform appears.

In the first embodiment, it has been the premise that the capacitance sensing circuit 21 is a C-V converting type which detects a capacitance by converting a capacitance to a voltage. However, the capacitance sensing circuit 21 may convert a capacitance to any data that is easy to process electrically or by software, and may convert a capacitance to, for example, a pulse width, or directly to a digital value.

Figure 7:
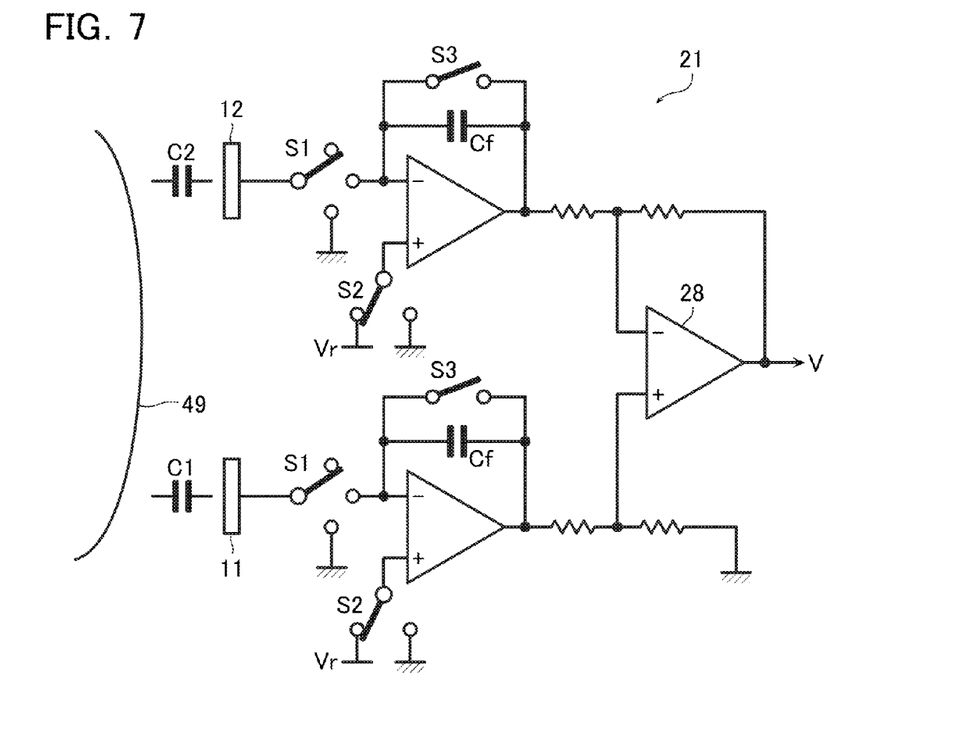
FIG. 7 is an explanatory diagram showing another example of one component of the occupant posture sensing apparatus according to the first embodiment of the present invention.

Further, in the first embodiment, the explanation has been given by using a C-V converting type as the capacitance sensing circuit 21. However, the capacitance sensing circuit 21 may be as follows, for example. As shown in FIG. 7, the capacitance sensing circuit 21 of this example is configured as a differentially operating type.

This configuration enables to cancel temperature characteristics in the circuit while eliminating so-called common-mode noises. Here, an explanation will be given to an example of a differentially-operating type circuit which employs the above-described method of transferring charges accumulated by charging at a known voltage to a known capacity and measuring the voltage of the capacity.

For example, it is possible to detect the position of the head 49 by connecting the first sensing electrode 11 to a plus-side input terminal of a differential amplifier 28 and the second sensing electrode 12 to a minus-side input terminal thereof, subtracting a capacitance C of the sensing electrode 12 from a capacitance C of the sensing electrode 11, and comparing the resulting output value with a threshold by means of a comparator or the like. The configuration of the sensing electrodes to be connected to the plus-side input terminal and minus-side input terminal may be changed.

Such a capacitance sensing circuit 21 operates in a manner of, for example, when switches 51 are opened (OFF), switches S2 are grounded (GND), and switches S3 are closed (ON), opening the switches S3 (OFF), switching the switches S2 to Vr, and connecting the switches S1 to inverting inputs of operational amplifiers. In response to this, the capacitances C1 and Cf are charged with C1Vr, and the capacitances C2 and Cf are charged with C2Vr.

Then, an output voltage V is measured when the switches S1 are grounded (GND) after the switches S1 have been opened (OFF) and the switches S2 have been grounded (GND). For example, the voltage at this time is $V/Vr=\{(Cf+C1)/Cf\}-\{(Cf+C2)/Cf\}$, which means that a voltage corresponding to the ratio between the capacitance C1 and the capacitance C2 has been output. Based on this voltage, the position of the head 49 can be detected likewise.

Metal members are often used in the inside of the vehicle interior ceiling 2 and the seat 40 of the vehicle 1, and the positional relationship between each of the sensing electrodes 11 and 12 and the occupant 48 might change when, for example, the occupant 48 changes his/her posture by moving the seat 40. Such a change in the external circumstance might cause detection of a capacitance value, which might lead to a malfunction.

In order that such an influence may be received the least, though not illustrated, an auxiliary electrode (a shield electrode) for suppressing such a capacitance change as described above may be provided at a position near each of the sensing electrodes 11 and 12, in addition to the shield portions 18 and 19 described above.

In this case, it is only necessary that each shield electrode be supplied with an equivalent potential to that of the first and second sensing electrodes 11 and 12. An equivalent potential may be generated by, for example, passing a potential applied to each of the sensing electrodes 11 and 12 through a unity amplifier (buffer) at a high input impedance as in the shield-driving circuit 23 described above, or in the case of the capacitance sensing circuit 21 shown in FIG. 7, the non-inverting input portion of the operational amplifier may be supplied to the shield electrode.

Figure 8:
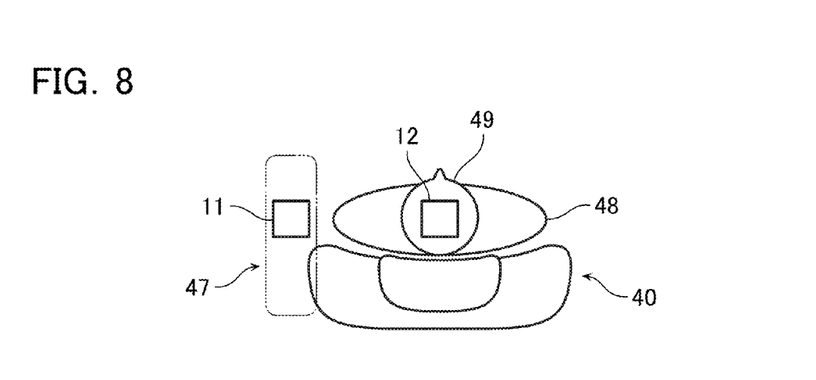
FIG. 8 is an explanatory diagram for explaining another example of one component of the occupant posture sensing apparatus according to the first embodiment of the present invention.

In the following explanation, any portions that are the same as those already explained will be denoted by the same reference numerals and will not be explained again. Here, a difference from the foregoing example is that the first sensing electrode 11 is provided at a portion of the vehicle interior ceiling 2 (unillustrated) that is at a lateral side of the seat 40, as shown in FIG. 8. Such a configuration enables to likewise appropriately adjust and control a range (unillustrated) over which to deploy a side air bag 47 with reference to posture information that is based on the left-right direction (X direction) position of the head 49 of the occupant 48.

In the first embodiment described above, a detected value is a capacitance value. However, a capacitance to be observed when no occupant 48 is sitting on the seat 40 may be measured as an initial capacitance, and an amount of increase from the initial capacitance may be used as a detected value. As described above, the occupant posture sensing apparatus 100 according to the first embodiment can sense the posture (sitting posture) of the occupant 48 with a very simple and low-cost configuration embodied by the capacitance sensor unit 10 including the sensing electrodes 11 and 12 and the circuit unit 20, and can use the posture information for controlling the deployment of air bags, etc.

Next, a second embodiment of an occupant posture sensing apparatus and occupant posture sensing method according to the present invention will be explained in detail. In the following explanation, any workings, effects, configurations, etc. that have been explained in the foregoing first embodiment will not be explained.

Figure 9:
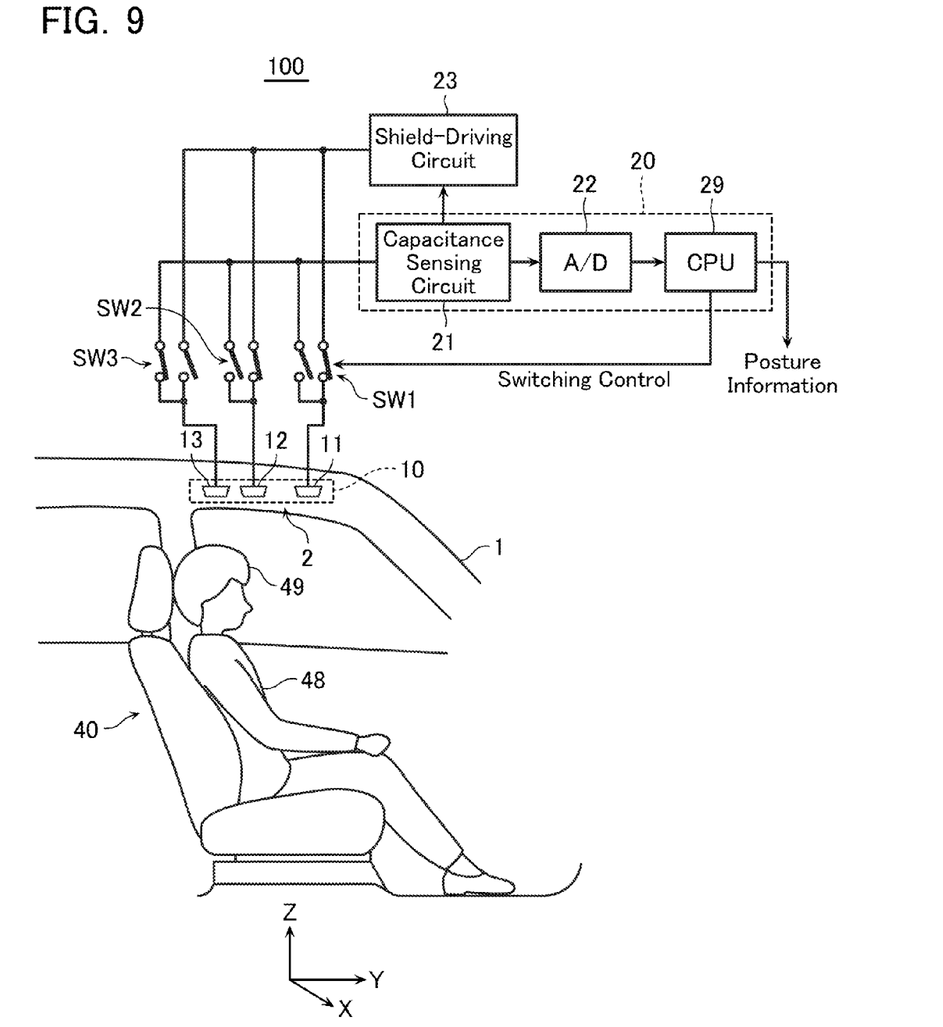
FIG. 9 is an explanatory diagram showing one example of an overall configuration of an occupant posture sensing apparatus according to a second embodiment of the present invention.

As shown in FIG. 9, an occupant posture sensing apparatus 100 according to the second embodiment includes: a capacitance sensor unit 10 including three sensing electrodes (a first sensing electrode 11, a second sensing electrode 12, and a third sensing electrode 13) which are arranged, for example, in a portion of the vehicle interior ceiling 2 that is above the seat 40 of the vehicle 1 so as to be capable of sensing, for example, the position on a plane, of the head 49 of the occupant 48 sitting on the seat 40; and a circuit unit 20 which determines a sitting posture based on the position of the head 49 of the occupant 48 sitting on the seat 40 by using an output from the capacitance sensor unit 10.

The sensing electrodes 11 to 13 of the capacitance sensor unit 10 are arranged inside the vehicle interior ceiling 2 or on the surface of the vehicle interior side such that, for example, the first sensing electrode 11 becomes a vertex at a front position of the vehicle 1, and the second and third sensing electrodes 12 and 13 are arranged above the seat 40 by being separated from each other in the left-right direction of the vehicle 1 and hence a triangular plane (for example, an isosceles triangle of which front vertex is the first sensing electrode 11) is formed when the sensing electrodes 11 to 13 are linearly connected to one another. The capacitance sensor unit 10 senses a capacitance between the head 49 of the occupant 48 and the vehicle interior ceiling 2 (specifically, the sensing electrodes 11 to 13). To be more specific, the capacitance sensor unit 10 senses a capacitance between the parietal region of the head 49 of the occupant 48 and the sensing electrodes 11 to 13.

The sensing electrodes 11 to 13 are connected to the capacitance sensing circuit 21 of the circuit unit 20 through, for example, selector switches SW1, SW2, and SW3 respectively, and to the shield-driving circuit 23 through these selector switches SW1 to SW3. The CPU 29 of the circuit unit 20 controls switching operations of the selector switches SW1 to SW3 by outputting a switching control signal. Specifically, the following switching control will be performed in the occupant posture sensing apparatus 100 of the present example.

That is, for example, when the selector switch SW1 is switched to connect the first sensing electrode 11 to the capacitance sensing circuit 21 in response to a switching control signal from the CPU 29, the selector switches SW2 and SW3 are switched to connect the second sensing electrode 12 and third sensing electrode 13 to the shield-driving circuit 23.

For example, when the selector switch SW2 is switched to connect the second sensing electrode 12 to the capacitance sensing circuit 21, the selector switches SW1 and SW3 are switched to connect the first sensing electrode 11 and third sensing electrode 13 to the shield-driving circuit 23.

Furthermore, for example, when the selector switch SW3 is switched to connect the third sensing electrode 13 to the capacitance sensing circuit 21, the selector switches SW1 and SW2 are switched to connect the first sensing electrode 11 and second sensing electrode 12 to the shield-driving circuit 23. In this way, the CPU 29 determines the sitting posture of the occupant 48 based on capacitance that are detected when the sensing electrodes 11 to 13 are connected to the capacitance sensing circuit 21 alternatively (i.e., when they are connected thereto in turn as switched among them). The other configurations, workings, and effects are the same as those explained in the foregoing first embodiment, and hence will not be explained.

Figure 10A:
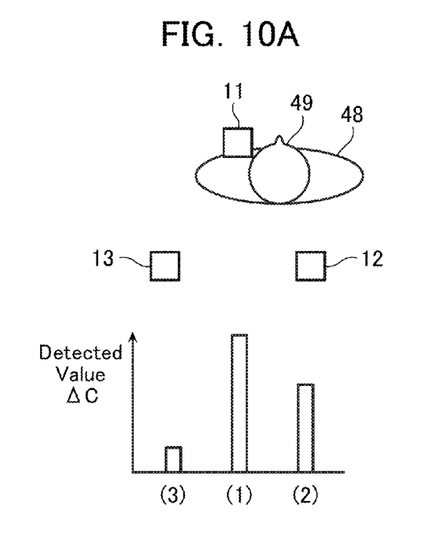
FIGS. 10A is explanatory diagrams for explaining one example of an operation principle of the occupant posture sensing apparatus.
Figure 10B:
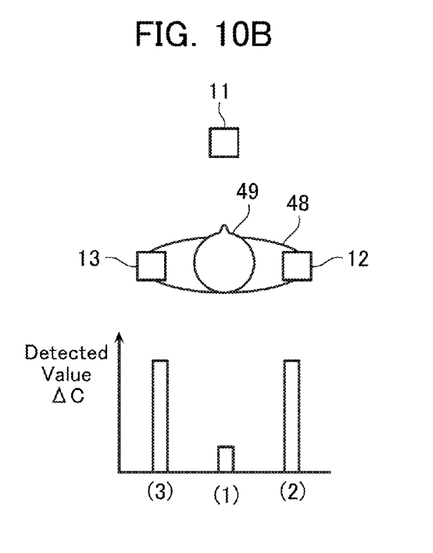
FIG. 10B is explanatory diagram for explaining one example of an operation principle of the occupant posture sensing apparatus.

For example, the occupant posture sensing apparatus 100 according to the second embodiment operates as shown in FIG. 10A and FIG. 10B. The numbers (1), (2), and (3) in FIGS. 10A and 10B correspond to the first to third sensing electrodes 11 to 13 respectively. For example, when the occupant 48 is sitting on the seat 40 lopsidedly to the front right of the vehicle 1 as shown in FIG. 10A, a detected value $\Delta C$ of the first sensing electrode 11 corresponding to (1) becomes higher than a detected value $\Delta C$ of the second sensing electrode 12 corresponding to (2) and a detected value $\Delta 3$ of the third sensing electrode 13 corresponding to (3). Therefore, it can be known that the head 49 (for example, the parietal region; the same applies hereinafter) of the occupant 48 exists approximately under the first sensing electrode 11 (i.e., at a front portion of the seat 40).

Comparison between the detected value ΔC of the second sensing electrode 12 corresponding to (2) and the detected value ΔC of the third sensing electrode 13 corresponding to (3) reveals that the detected value ΔC of the second sensing electrode corresponding to (2) is larger. Therefore, it can be known that the head 49 of the occupant 48 exists at a position near approximately under the second sensing electrode 12 (i.e., to the right). That is, the comparison among the detected values ΔC of the first to third sensing electrodes 11 to 13 reveals the sitting posture of the occupant 48, which in this case is lopsided to the front right of the seat 40.

On the other hand, for example, when the occupant 48 is sitting on the seat 40 in the center by leaning thereon in a normal condition (i.e., sitting in a normally basic posture that is fit to the shape of the seat 40) as shown in FIG. 10(*b*), the detected values ΔC of the second sensing electrode 12 and third sensing electrode 13 corresponding to (2) and (3) become higher than the detected value ΔC of the first sensing electrode 11 corresponding to (1). Therefore, it can be known that the head 49 of the occupant 48 exists under the second sensing electrode 12 and the third sensing electrode 13 (i.e., the occupant 48 is sitting on the seat 40 at the center position by leaning on the seat 40).

In this way, the distance from each of the sensing electrodes 11 to 13 to the head 49 of the occupant 48 can be obtained by using their detected values ΔC. Therefore, the position of the head 49 can be detected by using a well-known triangulation method, etc. However, the relationship between the detected value ΔC and the distance to the head 49 is also dependent on the size of the head 49 of the occupant 48, the distance from the head 49 to the vehicle interior ceiling 2, etc. Hence, the occupant posture sensing apparatus 100 according to the second embodiment performs the following process in addition to the above triangulation method in order to calculate the position of the head 49 appropriately.

That is, the occupant posture sensing apparatus 100 according to the second embodiment performs the following calculation process so that the position of the head 49 can be detected appropriately even when, for example, the size of the head 49 changes. First, the occupant posture sensing apparatus 100 stores the front-rear direction position of the head 49 obtained by the above-described operation as a parameter in an unillustrated memory means such as a RAM, a ROM, etc. provided in the circuit unit 20. For the purposes of process simplification and accurate position detection, the detected values ΔC are used for a corrective calculation process which uses a formula that a corrected value=the detected value of the second sensing electrode 12/(the detected value of the second sensing electrode 12+the detected value of the third sensing electrode 13).

Figure 11A:
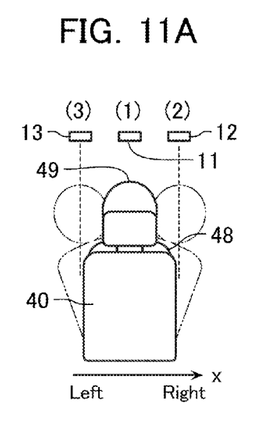
FIG. 11A is explanatory diagram for explaining a determining operation of the occupant posture sensing apparatus in a left-right direction.
Figure 11B:
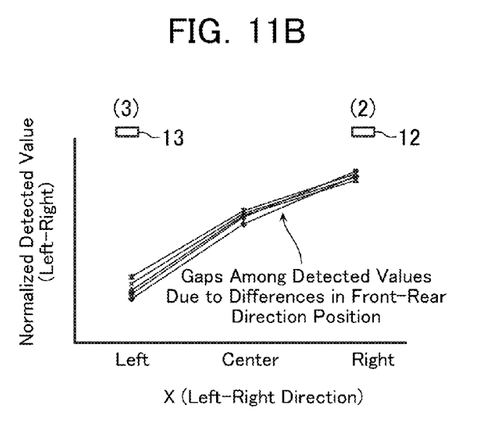
FIG. 11B is explanatory diagram for explaining a determining operation of the occupant posture sensing apparatus in a left-right direction.

For example, when the head 49 of the occupant 48 sitting on the seat 40 sways in the left-right direction (for example, X direction) as shown in FIG. 11A, relationships between left-right direction (X direction) positions of the head 49 of the occupant 48 and corrected values (normalized detected values (left-right)) which are calculated based on the detected values ΔC of the second and third sensing electrodes 12 and 13 are represented similarly as shown in FIG. 11 B, although there are some gaps among the detected values due to the differences in the front-rear direction position. In the occuapnt posture sensing apparatus including the sensing electrodes 11 to 13 which, when connected linearly, form an isosceles triangle of which front vertex is the first sensing electrode 11 as shown in FIG. 10A and FIG. 10B, the above-described normalized detected values (left-right) are scarcely influeced by the differences in the front-rear direction position of the head 49.

Next, the occupant posture sensing apparatus 100 stores the information about the left-right direction position determined in this way as a parameter like as described above, and performs a corrective calculation process which uses the detected values AC to use a formula that a corrected value= (the detected value of the first sensing electrode 11/{the detected value of the first sensing electrode 11+(the detected value of the second sensing electrode 12+the detected value of the third sensing electrode 13)/2}).

Figure 12A:
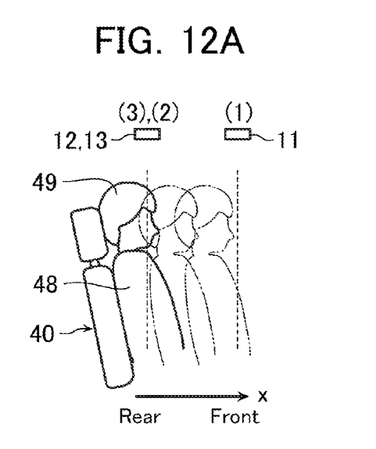
FIGS. 12A is explanatory diagrams for explaining a determining operation of the occupant posture sensing apparatus in a front rear direction.
Figure 12B:
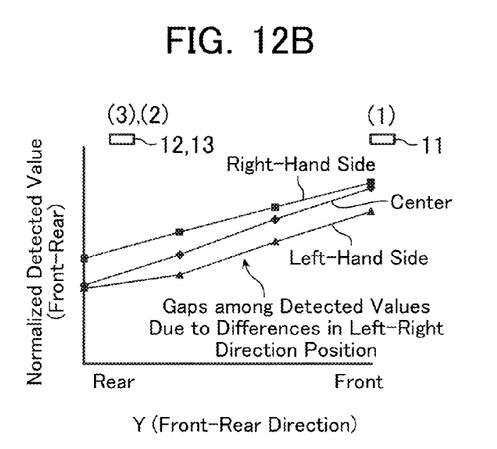
FIG. 12B is explanatory diagram for explaining a determining operation of the occupant posture sensing apparatus in a front-rear direction.

For example, when the head 49 of the occupant 48 sitting on the seat 40 sways in the front-rear direction (for example, Y direction) as shown in FIG. 12A, relationships between front-rear direction (Y direction) positions of the head 49 of the occupant 48 and corrected values (normalized detected values (front-rear)) which are calculated based on the detected values ΔC of the sensing electrodes 11 to 13 are represented as shown in FIG. 12B.

In the occupant posture sensing apparatus including the sensing electrodes 11 to 13 which, when connected linearly, form an isosceles triangle of which front vertex is the first sensing electrode 11 as shown in FIG. 10A and FIG. 10B, the above-described normalized detected values (front-rear) vary due to the differences in the left-right direction position of the head 49 (for example, a right-hand side, the center, a left-hand side, etc.) as shown in FIG. 12B. However, by reflecting the normalized detected value (front-rear) to the left-right direction position that has been determined beforehand as explained with reference to FIGS. 11A and 11B, it is possible to determine the front-rear direction position of the head 49 appropriately.

It is not indispensable to use the triangulation method explained with reference to FIGS. 10 A and 10B, but it is possible to employ the above-described corrective calculation process based on the theoretical formulae as the main process for detecting the head 49 (parietal region) so that the position of the parietal region of the head 49 can be detected directly. This is preferable because in this way, it is possible to obtain the position more appropriately while also reducing the process load, by directly detecting the parietal region that is more like a "dot" than the head 49 is like it.

The occupant posture sensing apparatus 100 according to the second embodiment determines the sitting posture of the occupant 48 by connecting the first to third sensing electrodes 11 to 13 to the one capacitance sensing circuit 21 through the selector switches SW1 to SW3, switching the selector switches SW1 to SW3 under the switching control of the CPU 29 to let the sensing electrodes 11 to 13 sense capacitance values respectively, and using these capacitance values. However, for example, the sensing electrodes 11 to 13 may each be provided with a capacitance sensing circuit 21. However, also in this case, the respective capacitance sensing circuits 21 must be synchronized, because otherwise, one sensing electrode that is in the middle of sensing (measuring) a capacitance incurs influence from a potential change which might occur in another sensing electrode during this sensing.

Figure 13:
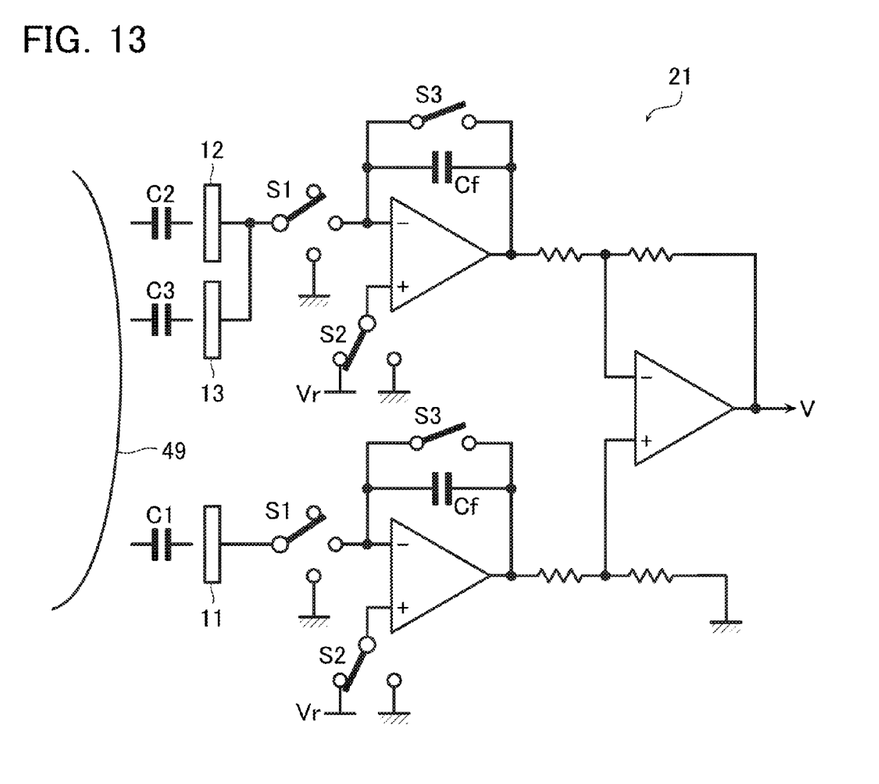
FIG. 13 is an explanatory diagram showing another example of one component of the occupant posture sensing apparatus according to the second embodiment of the present invention.

The capacitance sensing circuit 21 may be configured as follows. As shown in FIG. 13, the capacitance sensing circuit 21 of this example is configured as a differentially operating type. This configuration enables to cancel temperature characteristics in the circuit while eliminating so-called common-mode noises. Here, an explanation will be given to an example of a differentially-operating type circuit which employs the above-described method of transferring charges accumulated by charging at a known voltage to a known capacity and measuring the voltage of the capacity.

For example, it is possible to detect the position of the head 49 by connecting the first sensing electrode 11 to a plus-side input terminal and the second and third sensing electrodes 12 and 13 to a minus-side input terminal, subtracting a sum C2+C3 of the capacitances C2 and C3 of the second and third sensing electrodes 12 and 13 from a capacitance C1 of the first sensing electrode 11, and comparing the resulting output value with a threshold by means of a comparator or the like. Naturally, it is possible to detect the front-rear direction and left-right direction positions of the head 49, if the configuration of the sensing electrodes to be connected to the plus-side input terminal and minus-side input terminal is changed.

Such a capacitance sensing circuit 21 operates in a manner of, for example, when switches 51 are opened (OFF), switches S2 are grounded (GND), and switches S3 are closed (ON), opening the switches S3 (OFF), switching the switches S2 to Vr, and connecting the switches S1 to inverting inputs of operational amplifiers. In response to this, the capacitances C1 and Cf are charged with C1Vr, and the capacitances C2, C3, and Cf are charged with (C2+C3)Vr.

Then, an output voltage V is measured when the switches S1 are grounded (GND) after the switches S1 have been opened (OFF) and the switches S2 have been grounded (GND). For example, the voltage at this time is V/Vr={(Cf+C1)/Cf}−{(Cf+C2+C3)/Cf}, which means that a voltage corresponding to the ratio between the capacitance C1 and the capacitances C2 and C3 has been output. Based on this voltage, the position of the head 49 can be detected likewise.

Figures 14A, 14B:
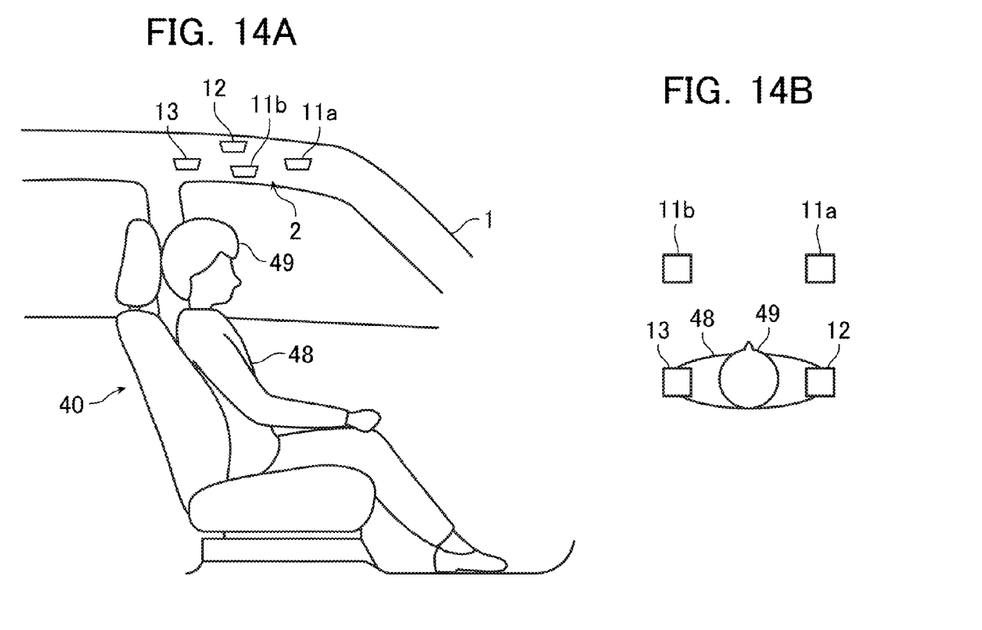
FIGS. 14A is explanatory diagrams for explaining another example of one component of the occupant posture sensing apparatus according to the second embodiment of the present invention.
FIG. 14B is explanatory diagram for explaining another example of one component of the occupant posture sensing apparatus according to the second embodiment of the present invention.

The sensing electrodes may be arranged as follows. Here, a difference from the foregoing example is that there are provided a right-hand-side first sensing electrode 11*a* and a left-hand-side first sensing electrode 11*b*, and the sensing electrodes 11*a*, 11*b*, 12, and 13 are arranged on the vehicle interior ceiling 2 such that when connected linearly, they form a quadrangular plane which has sides in the front-rear direction and left-right direction of the vehicle 1, as shown in FIGS. 14A and 14B.

With this configuration, it becomes possible to detect the sitting posture of the human body 48 more accurately based on the position of the head 49 of the human body 48 sitting on the seat 40. Here, there are provided four sensing electrodes, but there may be provided five or more, which is more effective because it becomes possible to improve the detection accuracy with a slight increase in the costs. The arrangement explained with reference to mainly FIGS. 10A and 10B to FIGS. 12A and 12B may be changed, for example, to form an isosceles triangle such that the first sensing electrode 11 is the only one vertex at the rear side of the vehicle 1.

As described above, the occupant posture sensing apparatus 100 according to the second embodiment can sense the posture (sitting posture) of the occupant 48 highly accurately with a very simple and low-cost configuration embodied by the capacitance sensor unit 10 including the sensing electrodes 11 to 13, etc. and the circuit unit 20, and can use the posture information for controlling the deployment of air bags, etc.

DESCRIPTION OF REFERENCE NUMERALS 1 vehicle
2 vehicle interior ceiling
10 capacitance sensor unit
11 first sensing electrode
11*a* right-hand-side first sensing electrode
11*b* left-hand-side first sensing electrode
12 second sensing electrode
13 third sensing electrode
18, 19 shield portion
20 circuit unit
21 capacitance sensing circuit
22 A/D converter
23 shield-driving circuit
29 CPU
40 seat
48 occupant (human body)
49 head
100 occupant posture sensing apparatus

The invention claimed is:

1. An occupant posture sensing apparatus, comprising:
a capacitance sensor disposed to a vehicle interior ceiling of a vehicle and sensing capacitance between a head of a human body sitting on a seat and the vehicle interior ceiling, wherein the capacitance sensor comprises two sensing electrodes which are arranged at portions of the vehicle interior ceiling that are above the seat so as to be capable of sensing capacitances between the head of the human body sitting on the seat and the vehicle interior ceiling, and which sense capacitances between the head of the human body sitting on the seat and the vehicle interior ceiling;
a detecting circuit which is connected to each of the sensing electrodes and detects a position of the head of the human body based on sensing signals from the sensing electrodes, wherein the detecting circuit comprises a capacitance sensing circuit sensing a capacitance value based on the sensing signals from the sensing electrodes; and
a posture determining circuit which determines a sitting posture of the human body according to a detection result from the detecting circuit.

2. The occupant posture sensing apparatus according to claim 1,
wherein one of the sensing electrodes is arranged to sense a capacitance between the head of the human body sitting on the seat and a portion of the vehicle interior ceiling that is ahead of and above a front of the seat, and the other of the sensing electrodes is arranged to sense a capacitance between the head of the human body sitting on the seat and a portion of the vehicle interior ceiling that is right above the seat.

3. The occupant posture sensing apparatus according to claim 1,
wherein one of the sensing electrodes is arranged to sense a capacitance between the head of the human body sitting on the seat and a portion of the vehicle interior ceiling that is at a lateral side of the seat, and the other of the sensing electrodes is arranged to sense a capacitance between the head of the human body sitting on the seat and a portion of the vehicle interior ceiling that is right above the seat.

4. The occupant posture sensing apparatus according to claim 1,
wherein the detecting circuit includes a capacitance sensing circuit of a C-V converting type which converts a capacitance sensed by each of the sensing electrodes to a voltage, and
the capacitance sensing circuit is connected to each of the sensing electrodes through switch means.

5. The occupant posture sensing apparatus according to claim 4, further comprising a shield-driving circuit which shield-drives one of the sensing electrodes.

6. The occupant posture sensing apparatus according to claim 5,
wherein the detecting circuit controls the switch means to connect the sensing electrode that is sensing a capacitance to the capacitance sensing circuit and the other sensing electrode to the shield-driving circuit.

7. The occupant posture sensing apparatus according to claim 1,
wherein the detecting circuit includes a capacitance sensing circuit of a differentially-operating type, and
an auxiliary electrode is provided near each of the sensing electrodes so as to be connected to such an input terminal of the capacitance sensing circuit as having a phase reverse to that of an input terminal to which the sensing electrode is connected.

8. The occupant posture sensing apparatus according to claim 1,
wherein the posture determining circuit outputs information regarding the determined sitting posture of the human body to an ECU which has a function of controlling deployment of an air bag mounted on the vehicle.

9. The occupant posture sensing apparatus according to claim 1, further comprising a shield portion which is provided on either or both of a back surface and a surrounding portion of each of the sensing electrodes and which is electrically insulated from the sensing electrode.

10. The occupant posture sensing apparatus according to claim 1,
wherein the detecting circuit includes memory means which pre-stores a capacitance value of when no human body is sitting on the seat, and when the human body is sitting on the seat, outputs a detection result by regarding an amount of increase from the capacitance value stored in the memory means as a detected value.

11. An occupant posture sensing apparatus, comprising:
a capacitance sensor disposed to a vehicle interior ceiling of a vehicle and sensing capacitance between a head of a human body sitting on a seat and the vehicle interior ceiling, wherein the capacitance sensor comprises at least three sensing electrodes which are arranged at portions of the vehicle interior ceiling that are above the seat so as to be capable of sensing a position on a certain plane, and which sense capacitances between the head of the human body sitting on the seat and the vehicle interior ceiling;
a detecting circuit which is connected to each of the sensing electrodes and detects a position of the head of the human body based on sensing signals from the sensing electrodes, wherein the detecting circuit comprises a capacitance sensing circuit sensing a capacitance value based on the sensing signals from the sensing electrodes; and
a posture determining circuit which determines a sitting posture of the human body according to a detection result from the detecting circuit.

12. The occupant posture sitting apparatus according to claim 11,
wherein the detecting circuit is connected to the sensing electrodes through selector switches respectively,
the occupant posture sitting apparatus further comprises a driving circuit which is connected to the sensing electrodes through the selector switches respectively, and outputs a certain voltage to each of the sensing electrodes, and
the posture determining circuit controls switching operations of the selector switches such that when one of the sensing electrodes is alternatively connected to the detecting circuit, the other sensing electrodes are connected to the driving circuit.

13. The occupant posture sensing apparatus according to claim 12,
wherein there are provided four of the sensing electrodes which are arranged on the vehicle interior ceiling to form a quadrangular plane such that it has sides in a front-rear direction and a left-right direction of the vehicle.

14. The occupant posture sensing apparatus according to claim 11,
wherein after detecting the position of the head of the human body directly from capacitance values of the respective sensing electrodes, the detecting circuit further performs a corrective calculation process that is required for obtaining a corrected value of the position of the head in an X direction and a corrected value of the position of the head in a Y direction from the capacitance values of the sensing electrodes to let the posture determining circuit determine the sitting posture of the human body based on the obtained corrected values.

15. The occupant posture sensing apparatus according to claim 11,
wherein the sensing electrodes are arranged on the vehicle interior ceiling to form a triangular plane such that it has only one vertex at a front side of the vehicle.

16. The occupant posture sensing apparatus according to claim 11,
wherein the sensing electrodes are arranged on the vehicle interior ceiling to form a triangular plane such that it has only one vertex at a rear side of the vehicle.

17. The occupant posture sensing apparatus according to claim 11,
wherein the detecting circuit includes a capacitance sensing circuit of a differentially-operating type, and
an auxiliary electrode is provided near each of the sensing electrodes so as to be connected to such an input terminal of the capacitance sensing circuit as has an inverting input of an input terminal to which the sensing electrode is connected.

18. The occupant posture sensing apparatus according to claim 11,
wherein the posture determining circuit outputs information regarding the determined sitting posture of the human body to an ECU which has a function of controlling deployment of an air bag mounted on the vehicle.

19. The occupant posture sensing apparatus according to claim 11, further comprising a shield portion which is provided on either or both of a back surface and a surrounding portion of each of the sensing electrodes and which is electrically insulated from the sensing electrode.

20. The occupant posture sensing apparatus according to claim 11,
wherein the detecting circuit includes memory means which pre-stores a capacitance value of when no human body is sitting on the seat, and when the human body is sitting on the seat, outputs a detection result by regarding an amount of increase from the capacitance value stored in the memory means as a detected value.

* * * * *